Aug. 29, 1961    C. R. HOUGHTON    2,998,269
PLASTIC PIPE COUPLING HAVING AN ADHESIVE COATED WEDGE RING
Filed Oct. 30, 1958    4 Sheets-Sheet 4

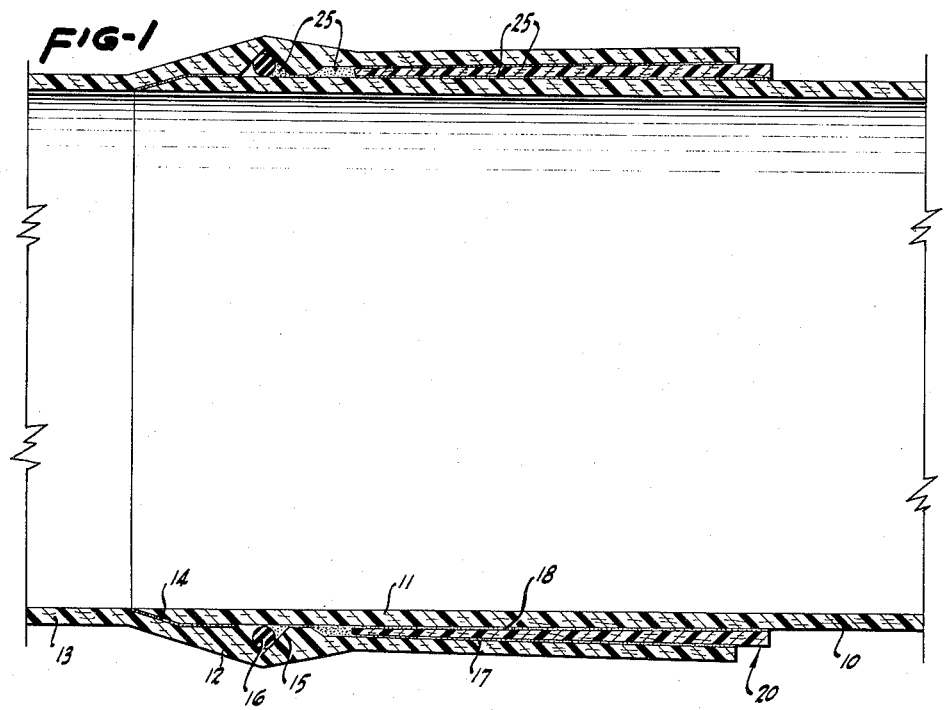
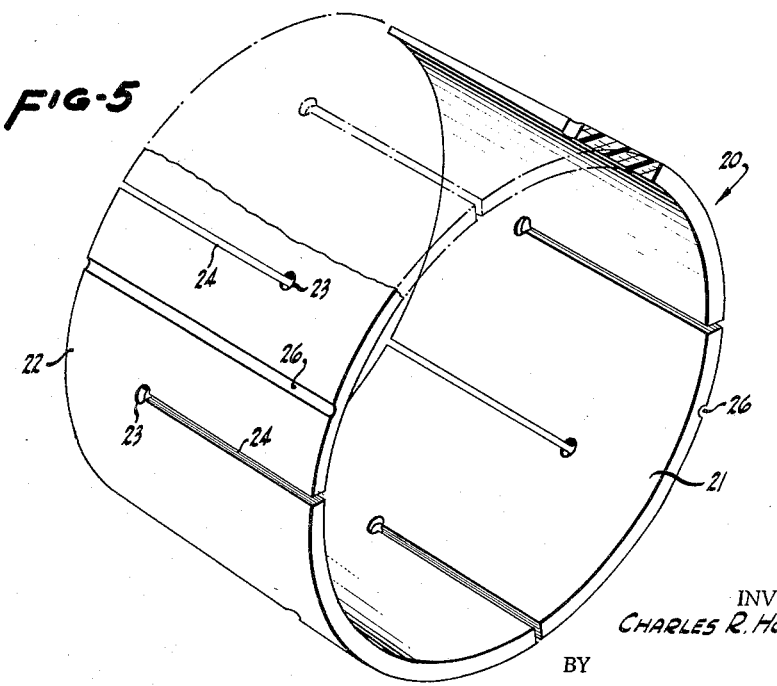

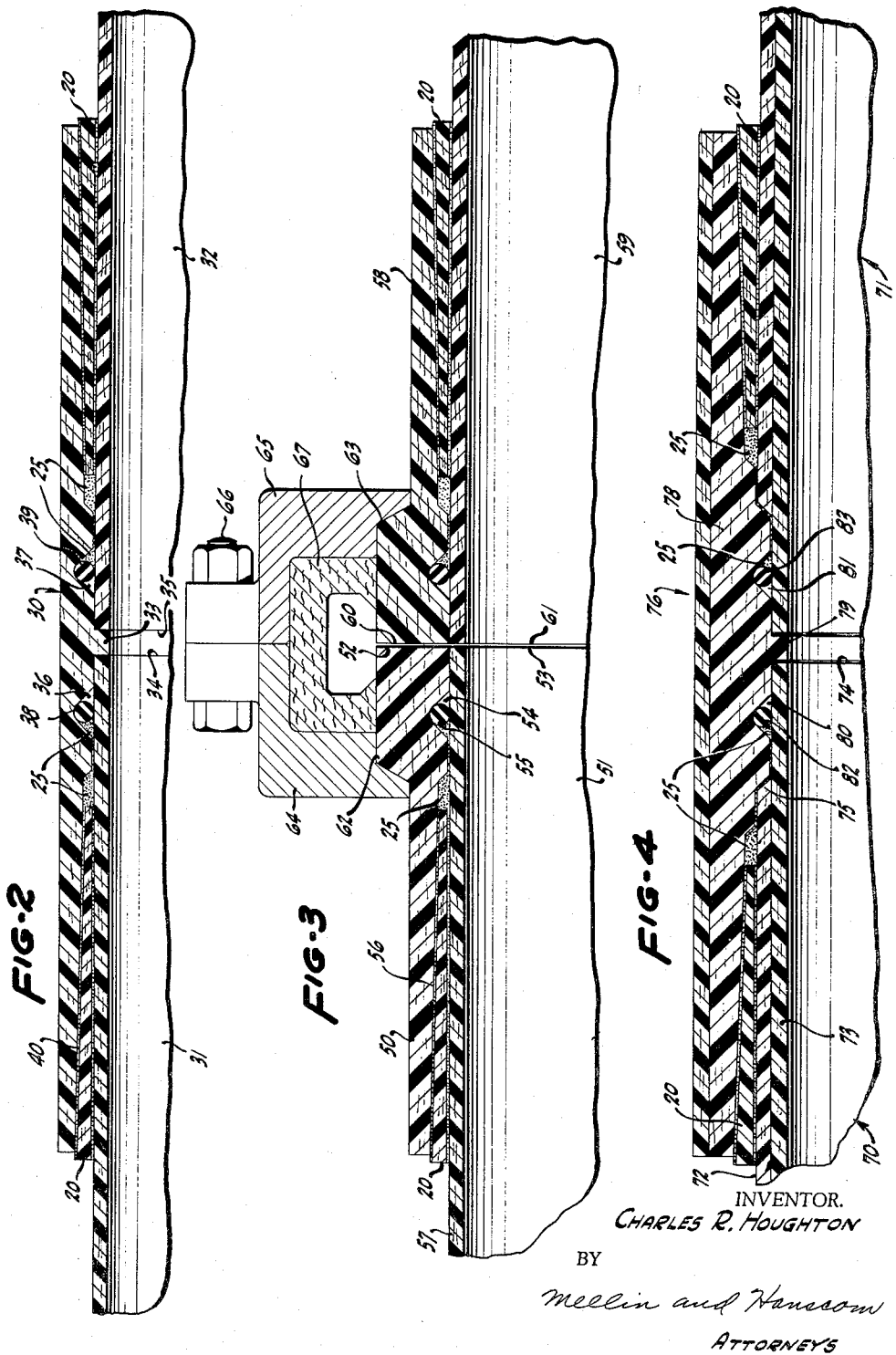

INVENTOR.
CHARLES R. HOUGHTON
BY
Mellin and Hanscom
ATTORNEYS

United States Patent Office 2,998,269
Patented Aug. 29, 1961

2,998,269
PLASTIC PIPE COUPLING HAVING AN ADHESIVE COATED WEDGE RING
Charles R. Houghton, Whittier, Calif., assignor to Amercoat Corporation, South Gate, Calif., a corporation of California
Filed Oct. 30, 1958, Ser. No. 771,706
3 Claims. (Cl. 285—260)

This invention relates to a pipe joint for use in coupling lengths of plastic pipe, reinforced plastic pipe, or composite plastic pipe and a method for making same.

This application is a continuation-in-part of my prior co-pending application, Serial No. 687,259, filed September 30, 1957, now abandoned and entitled "Coupling For Plastic Pipe."

It is a principal object of this invention to provide a mechanically strong adhesive coupling for joining together two lengths of plastic pipe, and a method for making such a coupling.

A further object of the invention is to provide an adhesive coupling for joining two lengths of plastic pipe, using a coupling member adapted to surround the end of one of the pipes and to form a tapered annular space therebetween and a wedge ring adapted to be driven into said annular space to form a mechanically rigid coupling, the coupling being permanently held by an adhesive.

A further object of the invention is to provide a coupling for joining two lengths of plastic pipe together comprising a coupling member adapted to surround the end of one of the pipes, an O-ring sealingly engaging the coupling member and pipe adjacent the end of the pipe, and a wedge ring driven between the coupling member and the pipe on the side of the O-ring away from said pipe end.

A further object is to provide a coupling as set out in the last object and adapted to couple two composite pipes having inner chemically resistant layers in which the joined pipe has a continuous inner layer exposed to a fluid within the pipe.

Other objects and advantages will become apparent in the course of the following detailed description.

In the drawings, forming a part of this application, and in which like parts are designated by like reference numerals throughout the same, FIG. 1 is a diametrical section of a bell type pipe joint made in accordance with the invention.

FIG. 2 is a fragmentary sectional view of a pipe joint employing a sleeve coupling.

FIG. 3 is a fragmentary sectional view of a pipe joint employing a separable flanged coupling.

FIG. 4 is a fragmentary sectional view of a pipe joint for composite lined pipes and employing a sleeve coupling.

FIG. 5 is a perspective view, with portions cut away, of the wedge ring used to form the pipe joints of FIGS. 1–4.

Figure 6:
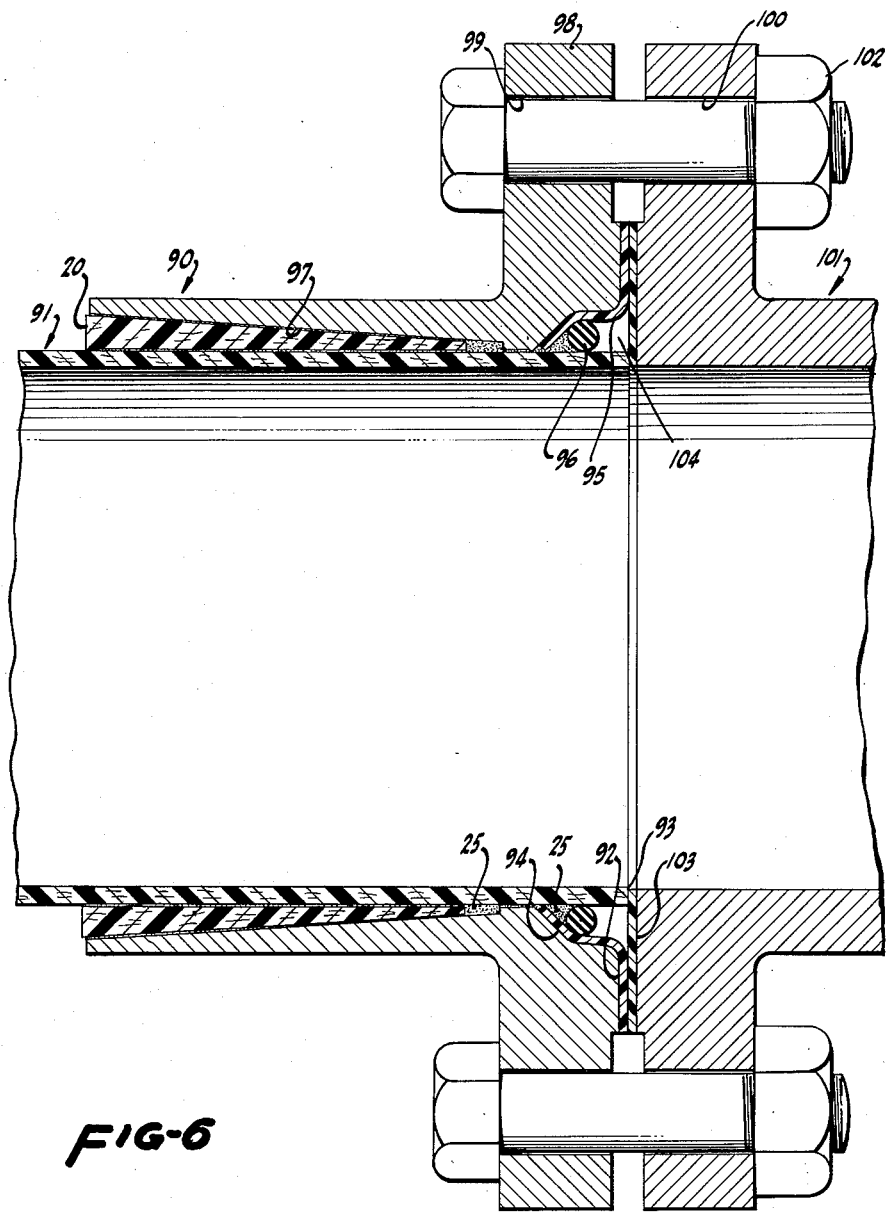
FIG. 6 is a sectional view of a pipe joint employing a metal flange joint.

Referring now to the drawings, wherein are shown various modifications of pipe joints made in accordance with the invention, FIG. 1 illustrates a bell type joint, wherein a first reinforced plastic pipe 10 has an end portion 11 adapted to slide within a bell shaped coupling member 12 formed integrally on a second pipe 13. The pipe end 11 is preferably sloped at 14 in a manner complementary to the outward sloping of the bell coupling so that the inner surfaces of the joined pipes will be continuous. An annular V-shaped groove 15 is formed on the inner surface of the coupling member, adjacent the end 11 of pipe 10 and carries an O-ring 16 therein in sealing engagement with pipe 10 and the coupling member 12. The coupling member has a portion 17 of its inner surface diverging from the outer surface 18 of pipe 10 so as to form an annular space between the coupling member 12 and the pipe 10, the annular space being tapered outwardly from the end 11 of pipe 10.

A wedge ring 20, best seen in FIG. 5, is adapted to be forced into the above mentioned annular space to lock the joint in final position. The wedge ring 20 has a cylindrical inner surface 21 of a diameter approximately equal to that of the outer surface 18 of pipe 10 and a tapered outer surface 22, the taper angle of the outer surface being of substantially the same degree as that of the tapered inner surface 17 of the coupling member 12. A plurality of holes 23 are drilled through the wedge ring 20 and longitudinal slots 24 extend from these holes, in alternate directions to the ends of the wedge ring, thus enabling the wedge ring to circumferentially expand or contract to a limited degree. The wedge ring is also preferably composed of a reinforced plastic material.

In the assembly of the joint, the wedge ring 20 is slid onto the end of pipe 10, and an O-ring 16 is placed in the coupling member annular groove 15. An adhesive 25 is then applied to the outer surface 18 of the pipe end 10, and to either, or both, of the inner tapered surface 17 of the coupling member 12, and the outer surface 22 of the wedge ring. The pipe 10 is then slid into the coupling member, past the O-ring 16 and into the position shown in FIG. 1. The wedge ring 20 is then forced along pipe 10 and wedged into the tapered annular space between the coupling member and the pipe to form a rigid coupling. During the movement of the wedge ring into its final position, a portion of the adhesive 25 will be forced towards the end of pipe 10 but will be stopped by the O-ring 16 so that the annular groove 15 will be filled by the adhesive on the side of the O-ring away from the end of the pipes as well as the contacting surfaces of the pipe and coupling member between the O-ring and the wedge ring. Thus, the O-ring prevents any adhesive from being forced into the interior of the pipe, and the adhesive filling the annular groove 15 acts as a back-up ring for the O-ring to increase the sealing effect of the O-ring. Longitudinal grooves 26 allow the excess adhesive to flow from the joint during the wedging operation so that the wedge ring may fit tightly between the pipe and coupling member.

The adhesive contemplated for use is preferably an epoxy, polyurethane or phenolic adhesive which will cold cure and will provide not only an excellent adhesion between two thermoset reinforced plastic surfaces, but will have a high shear strength as well.

As may be seen, the joint formed in accordance with the above employs two interdependent mechanisms for its proper function as an adhesive coupling for plastic pipes which are to retain or exclude a fluid under pressure; i.e., a rubber-like O-ring 16 used as a seal and a ring wedge 20 used to effect a strong adhesive bond between the separate parts.

The O-ring 16 may be made of various flexible materials to withstand varying chemical environments and is positioned in the groove 15 so as to form a seal between the pipe and coupling member effective against either internal or external pressures. As such, the O-ring serves several purposes; i.e., to make a fluid-tight seal to prevent fluid within the pipe from reaching the adhesive bond, and to prevent adhesive from entering and restricting the inside of the joined pipes as the joint is formed. The joint of the character described has an important advantage in that the joint is mechanically strong as soon as the wedge ring is forced into place, and thus the joined pipe may be handled without waiting for the adhesive to cure. Such an advantage, of course, is of great importance in field work where long pipe lines must be assembled and handled without unnecessary delays. The use of the wedge ring also insures that the coupled pipes will be centered and also prevents any disalignment after assembly despite rough handling of the joint. Furthermore, the wedge ring will force the adhesive into a complete coverage of the contacting parts and will apply a positive pressure to the uniformly thin adhesive layer during the curing process so that a very rigid joint will be formed. The use of the wedge ring also enables some of the adhesive 25 to be forced tightly against the O-rings so that a solid back-up ring of adhesive will be provided to hold the O-ring in sealing engagement with the pipe and coupling member. It will be noted that these preceding advantages are obtained despite large tolerances in the diameter of pipe 10, as the wedge ring is capable of circumferentially expanding or contracting to fit snugly on the outer surface of the pipe.

Many of these advantages of the use of the wedge ring may be obtained without the use of the O-ring in the joint, as the mechanical strength of the joint will be the same. However, the joint will not have the same fluid tightness of a joint employing the O-ring, and some adhesive may be forced into the interior of the pipe during the formation of the joint if the O-ring is not used.

FIG. 2 illustrates a sleeve type coupling in which the coupling member 30 surrounds the ends of two pipes 31 and 32 joined together in end-to-end relation. An annular flange 33 projects inwardly from the coupling member, against which the extreme ends 34 and 35 of the two pipes abut, the flange being equal in height to the thickness of the pipes to form a continuous inner surface of the joint. The inner surface of the coupling member is annularly grooved at 36 and 37 to receive O-rings 38 and 39 therewithin to seal against the ends of the pipes, as in the previous modification and for the same purpose. A portion 40 of the inner surface of the coupling member 30 diverges away from the pipe 31 to form a tapered annular space therebetween; the other end of the coupling member being similarly formed to provide a tapered annular space between the coupling member and the pipe 32. This modification is assembled in the same manner as the last example with wedge rings 20 being placed about the pipes 31 and 32 and the adhesive 25 being then applied. The pipes 31 and 32 are then slid into the coupling member past the O-rings 38 and 39, until they abut the flange 33. The wedge rings are then forced into place in the tapered annular space, as before.

FIG. 3 illustrates a modification of the invention as applied to a separable sleeve coupling. In this modification, a first coupling member 50 surrounds the end of pipe 51, the coupling member having an end 52 flush with the extreme end 53 of pipe 51. Again, the coupling member 50 has an annular groove 54, an O-ring 55 therein, and a surface 56 diverging from the outer surface 57 of pipe to form a tapered annular space therebetween to receive a wedge ring 20. A second coupling member 58 identical to coupling member 50 is mounted on the end of pipe 59 in the same manner, and has an end 60 flush with the extreme end 61 of pipe 59. Coupling members 50 and 58 are each provided with external flanges 62 and 63, so that metallic clamping members 64 and 65 may engage the coupling member flanges 62 and 63. The clamping members are fastened together by suitable bolts 66 to hold the assembly together, and the joint is rendered fluid tight by packing 67. As is obvious, the coupling members 50 and 58 are secured to pipes 51 and 59 in a manner as previously described, and the pipe may be joined, or separated, as desired, by means of the clamping members 64 and 65. When clamped together, the coupling members 50 and 59 serve the same function as the integral coupling of the previous embodiment, and thus may be considered as a unitary, although separable, coupling member.

FIG. 4 illustrates a coupling designed to join two composite pipes 70 and 71 having an inner extruded rigid vinyl layer, with an overlayer of fiber glass reinforcing in a thermosetting resin, such as an epoxy, a polyester or a phenolic composition. Such pipes overcome many of the objections of presently made rigid vinyl pipe, in that it will provide a very highly chemically resistant interior surface of some thickness, and, in addition, will have the strength of the thermoset fiber glass reinforcing. At the present time, rigid vinyl pipes are not satisfactory for use at pressures much above 50 p.s.i., and in the large diameters are not satisfactory even then. However, with the addition of the exterior fiber glass reinforcing, the composite pipe will withstand much higher pressures without failure. To obtain the advantages of such a composite pipe, it is necessary that a coupling member be used which will provide a continuous vinyl surface throughout the joint, for otherwise the joint will be subject to failure if any of the fluid within the pipe can come into contact with the less chemically resistant, but physically stronger, outer layer of the pipe.

A joint as will insure the desired result is illustrated in FIG. 4. The composite pipe 70 has an outer layer 72 of fiber glass reinforcing impregnated with a thermosetting resin, and an inner layer 73 of extruded rigid vinyl, the end 74 of the inner layer 73 extending axially beyond the end 75 of the outer layer 72. Composite pipe 71 is formed in the same manner.

A coupling member 76 is formed with an outer layer 77 of fiber glass reinforcing and an inner rigid vinyl layer 78, the inner layer being adapted to surround the exposed inner vinyl layer of the two pipes. An internal flange 79 is provided in the coupling to abut the ends of the two pipes, as before. Annular grooves 80 and 81 are formed on the inner surface of the coupling member 76, to receive O-rings 82 and 83 therein, in sealing engagement with the inner layers of the two pipes. Again, the coupling member 76 has the inner surface thereof diverging from the outer surface of the pipes 70 and 71 to form tapered annular spaces therebetween to receive the wedge rings 20, and the coupling is assembled in a manner as previously described.

The O-rings 82 and 83, together with the adhesive 25 in grooves 80 and 81 backing the O-rings, will prevent any fluid within the pipes from passing thereby, and thus the fluid can never come into contact with the outer fiber glass reinforcing layers, but will be limited in contact to the chemically resistant inner vinyl layers.

FIG. 6 illustrates a joint embodying the principle of the invention and utilizing a flanged coupling member of steel or other similar metal. Such a flanged coupling member may be used to couple two plastic pipes together, or may be used to couple a plastic pipe to a valve, a steel fitting, or a section of steel pipe.

In this modification, a steel coupling member 90 surrounds the end of a plastic pipe 91, the coupling member having an end 92 substantially flush with the extreme end 93 of the pipe. Again, the coupling member has an annular groove 94 adjacent the end thereof. An annular liner member 95, preferably formed from the same material as comprises pipe 91, covers the surface of the groove 94 and extends to the end of the coupling member to cover the end 92 thereof. An O-ring 96 is disposed within the lineal groove to provide a seal between the coupling member and the pipe, as in the prior modification.

The coupling member 90 has an inner surface 97 diverging from the outer surface of the pipe 91 to form a tapered annular space therebetween into which the tapered wedge ring 20 is driven, again causing a portion of the adhesive 25 to fill the groove 94 on the wedge ring side of the O-ring.

The coupling member 90 is provided with an external flange 98 having openings 99 therethrough in alignment with similar openings 100 of a flanged steel member 101, so that bolts 102 may couple the pipe 91 to the flanged member 101. As stated above, the flanged member 101 may be that found on a valve, pipe, or any other such conduit device.

A gasket 103 is used to render the completed joint watertight. The liner member 95 insures that the fluid conveyed by the pipe 91 cannot come into contact with the coupling member 90 and thus prevents any danger of corrosion to the coupling member if there should be any leakage of the fluid past the end of pipe 91 into the space 104 between the pipe and coupling member.

Figure 7:
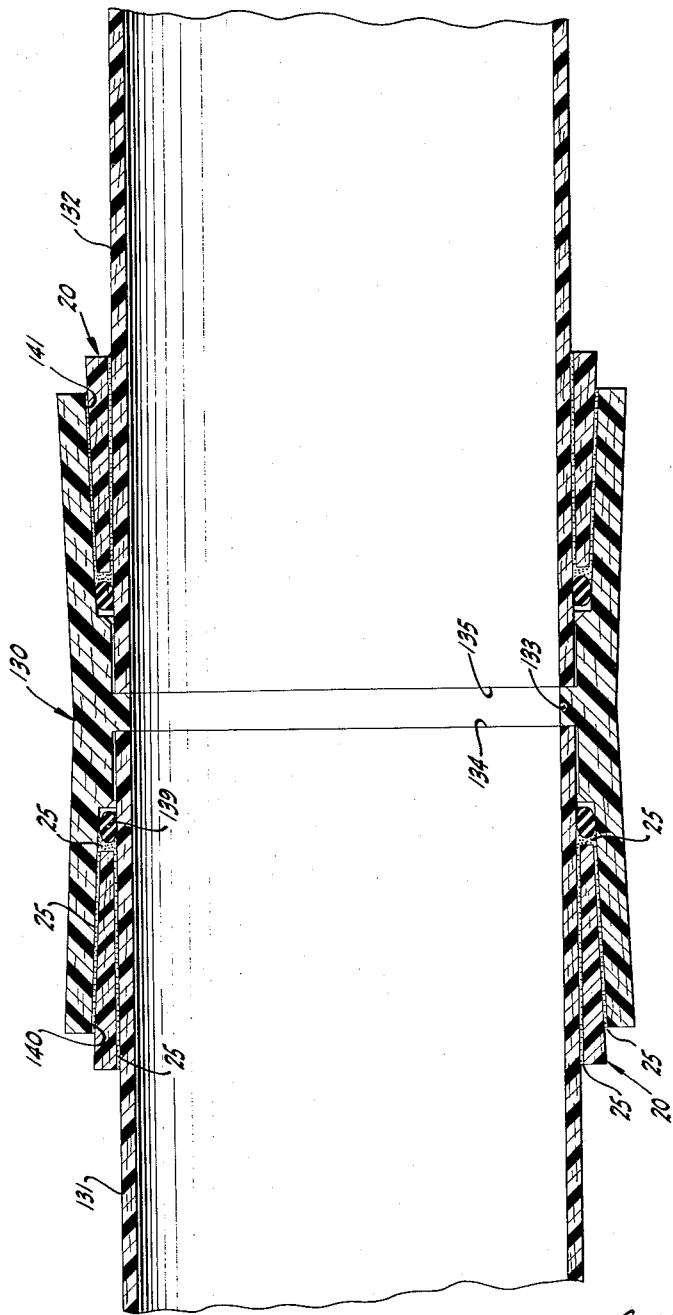
FIG. 7 is a sectional view of a pipe joint embodying the invention as used with a sleeve coupling.

FIG. 7 illustrates another modification of a joint embodying the principle of the invention. This joint is quite similar to that shown in FIG. 2, except that the sleeve coupling member 130 has been modified to provide an improved method of making the joint between pipes 131 and 132.

The coupling member 130 again has an inwardly projecting annular flange 133 to serve as a stop member for the extreme ends 134 and 135 of the pipes, the flange 133 being equal in height to the wall thickness of the pipes to form a continuous surface at the joint. The inner wall of the coupling member diverges away from the pipes 131 and 132 at 140 and 141 to provide the tapered annular space between the coupling member and the pipes, as before, but the annular grooves for the O-rings (such as 36 and 37 of coupling 30) have been omitted in this embodiment.

In the following discussion as to the manner of forming the joint shown in FIG. 7, it is assumed that the coupling member has already been secured to pipe 131. A wedge 20 is slid onto the end 135 of pipe 132 so that several inches of the pipe end are exposed, and adhesive 25 is applied to the outside of the wedge and to the end of the pipe 132 in front of the wedge. The O-ring 139 is now placed around the pipe and is located right at the extreme end 135 thereof.

The pipe is now inserted into the coupling, and as the pipe travels into the coupling, the O-ring 139 rolls on the tapered surface 141 of the coupling into the coupling and back away from the extreme end of the pipe. Because of the taper of the coupling surface, the O-ring is compressed as it rolls into the coupling, thus automatically making a positive seal between the pipe and the coupling. In addition, the entrance of the pipe into the coupling is easily made because of the rolling motion of the O-ring. Once the pipe is in place against the rib 133 of the coupling, the wedge 20 is driven into place, which forces a quantity of the adhesive 25 ahead of the wedge and against the O-ring to form a back-up ring therefor. After suitable curing, the joint will be complete with an O-ring seal which is not only tightly compressed but also solidly backed up by the set adhesive.

It is to be understood that the forms of the invention, herewith shown and described, are to be taken as preferred embodiments of the same, and that various changes in the shape, size arrangement of parts may be resorted to without departing from the spirit of my invention or the scope of the attached claims.

Having thus described my invention, what I claim and desire to secure by Letters Patent is:

1. A coupling comprising a socket having an open end and an inner wall diverging towards said end, a plastic pipe received in said socket defining a tapered annular space therewith, an O-ring in wedging sealing engagement with said pipe and socket remote from said end and in communication with said space, a plastic wedge ring received in said space and tightly engaging said pipe and socket, and a body of adhesive coating the contacting surfaces of said wedge ring with said pipe and socket and substantially filling the remainder of said space and extending from said wedge ring to said O-ring to reinforce said O-ring.

2. A coupling as set forth in claim 1 wherein said socket contains a groove remote from said annular space, and said O-ring is received in said groove.

3. A coupling as set forth in claim 1 wherein said body of adhesive is initially in a fluid state when said coupling is first made and is later cured.

References Cited in the file of this patent

UNITED STATES PATENTS

| | | |
|---|---|---|
| 385,287 | Story | June 26, 1888 |
| 595,437 | Greenfield | Dec. 14, 1897 |
| 693,830 | Burke | Feb. 25, 1902 |
| 765,437 | Milson | July 19, 1904 |
| 1,494,523 | Zwicker | May 20, 1924 |
| 1,967,467 | Damsel | July 24, 1934 |
| 1,986,357 | Perry | Jan. 1, 1935 |
| 2,070,291 | McHugh | Feb. 9, 1937 |
| 2,091,852 | Hinds | Aug. 31, 1937 |
| 2,346,051 | Seamark | Apr. 4, 1944 |
| 2,437,586 | Aber | Mar. 9, 1948 |
| 2,515,899 | Stevens | July 18, 1950 |
| 2,639,731 | Whiting | May 26, 1953 |
| 2,751,237 | Conley | June 19, 1956 |
| 2,759,254 | Soehnlen | Aug. 21, 1956 |
| 2,773,710 | Smith | Dec. 11, 1956 |

FOREIGN PATENTS

| | | |
|---|---|---|
| 270,219 | Germany | Feb. 10, 1914 |
| 70,186 | Switzerland | Jan. 17, 1916 |
| 310,452 | Great Britain | June 20, 1929 |
| 310,457 | Great Britain | June 20, 1929 |
| 1,115,104 | France | Dec. 25, 1955 |

OTHER REFERENCES

Journal American Water Works Association, vol. 48, No. 7, July 1956, page 870.